United States Patent
DiMassimo et al.

(10) Patent No.: US 7,147,778 B1
(45) Date of Patent: Dec. 12, 2006

(54) METHOD AND SYSTEM FOR NITRIFYING AND DENITRIFYING WASTEWATER

(75) Inventors: Richard W. DiMassimo, Raleigh, NC (US); Sun-Nan Hong, Cary, NC (US); Hong Zhao, Raleigh, NC (US); Luther Wood, Cary, NC (US)

(73) Assignee: I. Kruger Inc., Cary, NC (US)

( * ) Notice: Subject to any disclaimer, the term of this patent is extended or adjusted under 35 U.S.C. 154(b) by 0 days.

(21) Appl. No.: 11/326,538

(22) Filed: Jan. 5, 2006

(51) Int. Cl.
*C02F 3/30* (2006.01)

(52) U.S. Cl. .................. 210/605; 210/623; 210/903; 210/906

(58) Field of Classification Search ................ 210/605, 210/620, 621, 623, 630, 903, 906
See application file for complete search history.

(56) References Cited

U.S. PATENT DOCUMENTS

| | | | |
|---|---|---|---|
| 4,056,465 A | 11/1977 | Spector | |
| 5,137,636 A | 8/1992 | Bundgaard | |
| 5,536,407 A | 7/1996 | Petersen | |
| 5,650,069 A | 7/1997 | Hong et al. | |
| 6,045,698 A | 4/2000 | Cote et al. | |
| 6,126,827 A * | 10/2000 | Johnson et al. | 210/602 |
| 6,303,035 B1 | 10/2001 | Cote et al. | |
| 6,375,848 B1 | 4/2002 | Cote et al. | |
| 6,485,645 B1 * | 11/2002 | Husain et al. | 210/605 |
| 6,547,968 B1 | 4/2003 | Rabie et al. | |
| 6,613,222 B1 * | 9/2003 | Mikkelson et al. | 210/138 |
| 6,708,957 B1 | 3/2004 | Cote et al. | |
| 6,790,360 B1 | 9/2004 | Pedersen et al. | |
| 6,805,806 B1 | 10/2004 | Arnaud | |
| 6,843,908 B1 | 1/2005 | Okajima et al. | |
| 6,863,818 B1 | 3/2005 | Daigger et al. | |
| 6,893,568 B1 | 5/2005 | Janson et al. | |
| 6,899,811 B1 | 5/2005 | Cote et al. | |
| 6,899,812 B1 | 5/2005 | Cote et al. | |
| 6,946,073 B1 | 9/2005 | Daigger et al. | |
| 2004/0222150 A1 * | 11/2004 | Hong et al. | 210/605 |
| 2005/0274669 A1 * | 12/2005 | Marchesseault et al. | 210/605 |
| 2006/0108282 A1 * | 5/2006 | Ames et al. | 210/609 |
| 2006/0169636 A1 * | 8/2006 | Devine | 210/605 |

FOREIGN PATENT DOCUMENTS

| | | | |
|---|---|---|---|
| JP | 11-244891 | * | 9/1999 |
| JP | P2003-285094 | * | 10/2003 |

* cited by examiner

*Primary Examiner*—Fred G. Prince
(74) *Attorney, Agent, or Firm*—Coats & Bennett, P.L.L.C.

(57) ABSTRACT

A wastewater treatment system is provided that includes first and second reactors, each operative to nitrify or denitrify wastewater contained therein. Downstream from the first and second reactors is a membrane reactor that operates under aerobic conditions and includes one or more submersed membranes for separating solids. Extending between the membrane reactor and each of the first and second reactors is a return activated sludge line with appropriate controls for permitting return activated sludge to be directed to one of the reactors at a time. To nitrify and denitrify wastewater, a wastewater influent stream is alternatively directed to the anoxic reactors which are alternatively operated under aerobic and anoxic conditions so as to nitrify or denitrify the wastewater contained therein. To reduce or minimize the dissolved oxygen return from the membrane reactor to the first and second reactors, the flow of return activated sludge is controlled such that generally return activated sludge is returned to the reactor operating under aerobic conditions.

17 Claims, 3 Drawing Sheets

METHOD AND SYSTEM FOR NITRIFYING AND DENITRIFYING WASTEWATER

FIELD OF THE INVENTION

The present invention relates to wastewater treatment, and more particularly to a system for nitrifying and denitrifying wastewater.

BACKGROUND OF THE INVENTION

Nitrogen removal is a difficult problem facing municipalities and sewer authorities throughout the world. While there has been significant advancement in nitrogen removal through biological treatment, efficient and effective nitrogen removal in a cost effective manner remains challenging. This is especially true in view of low nitrogen limits now being promulgated by many municipalities and governmental bodies.

In its basic form, nitrogen removal is a two-step process that entails nitrification and denitrification. The nitrification process is carried out under aerobic conditions and involves the oxidation of nitrogen in the form of ammonia so as to form nitrate. The nitrification process is represented as follows:

$$NH_3 + CO_2 + O_2 \xrightarrow{bacteria} NO_3 + \text{new bacteria}$$

Denitrification, on the other hand, is carried out under anoxic conditions and entails the decomposition of organic matter using nitrate ions as an oxidant. As a result of the decomposition, nitrate ions are reduced to free nitrogen which is given off in a gaseous form. This denitrification process can be represented as follows:

$$NO_3 + \text{organic matter} \xrightarrow{bacteria} N_2(gas) + \text{new bacteria}$$

Membrane bioreactor (MBR) activated sludge systems have been used to remove nitrogen from wastewater. These systems will typically include one or more anoxic reactor, one or more aerobic reactor followed by an aerobic reactor having membranes therein that are submerged or immersed within the aerobic reactor. In the anoxic reactor, denitrifying organisms utilize available organic carbon in the wastewater to reduce nitrate-nitrogen ($NO_3$) to nitrogen gas ($N_2$). In the anoxic reactor, the desired electron acceptor is nitrate and the presence of other electron acceptors, such as oxygen ($O_2$) will compromise the denitrification rate and the overall effectiveness of the denitrification process. In the aerobic bioreactor, influent ammonia ($NH_3$), as discussed above, is converted to nitrate and the nitrate-rich mixed liquor is recycled to the anoxic reactor. Typically the anoxic reactor volume is 10% to 30% of the total bioreactor volume. In cases where submerged membranes are used, the membranes act as a solids separation unit, where permeate is drawn through the membrane and the excluded or separated solids are recycled along with the nitrate back to the anoxic zone. The immersed membranes are subject to fouling due to a biomass concentration gradient produced by the flux and the subsequent accumulation and dewatering mechanism acting on the solids. The area immediately under and adjacent to the membrane modules must be scoured continuously with compressed air in order to minimize the fouling. The high air scour flow rate required to effectively scour the membranes often results in a local high dissolved oxygen concentration, which is then recycled to the anoxic reactor along with the recycled biomass or sludge. This dissolved oxygen carryover effect results in a reduced denitrification rate due to the presence of the alternative electron receptor ($O_2$) and a reduction of a readily available carbon source (soluble BOD). This results in the effluent having an elevated soluble nitrogen concentration. This effect becomes more evident as the treatment facility approaches design flow capacity and the actual hydraulic detention time in the anoxic reactor decreases. Since the volume, and detention time, of the anoxic reactor is small compared to that of the aerobic treatment reactors and zone, and recirculation rates are high (2 to 5 times influent flow rates), the high dissolved oxygen concentration in the recycled stream cannot be adequately reduced. In order to overcome this effect, an external organic carbon source must be added to the anoxic zone.

SUMMARY OF THE INVENTION

The present invention entails a process for nitrifying and denitrifying wastewater and reducing or minimizing the dissolved oxygen concentration in a denitrification zone during the process. Wastewater influent is alternatively directed to first and second zones. At various times during the process the first zone is maintained as a nitrification zone and the second zone is maintained as a denitrification zone. At other times the first zone is maintained as a denitrification zone and the second zone is maintained as a nitrification zone. Alternatively, wastewater or mixed liquor in the first and second zones is directed to a downstream aerobic reactor having one or more immersed membranes contained therein. The downstream aerobic reactor is aerated. Wastewater or mixed liquor in the aerobic reactor is directed into one or more immersed membranes for separating the wastewater into permeate and return activated sludge. The permeate is pumped from the one or more immersed membranes. The resulting activated sludge in the aerobic reactor is returned to either the first or second zones. The process reduces or minimizes the dissolved oxygen concentration in the denitrification zones by selectively directing the return activated sludge to the first or second zone being maintained as a nitrification zone and switching the flow of the return activated sludge during the process between the first and second zones so as to direct the return activated sludge to the zone being maintained as a nitrification zone.

Further, the present invention entails a process for not only performing nitrification and denitrification, but also phosphorus removal. In this case, an anaerobic reactor is placed upstream from the first and second zones that are alternatively utilized as nitrification and denitrification zones. In this case, return activated sludge is directed from the downstream aerobic reactor having the one or more immersed membranes to either the first or second zone being maintained under aerobic conditions for purposes of nitrification. To effectively remove phosphorus from the wastewater, the wastewater or mixed liquor in the first or second zones being maintained under anoxic or denitrifying conditions is recycled to the anaerobic zone containing one or more reactors. Hence, the process is effective for both nitrification-denitrification and biological phosphorus removal.

Other objects and advantages of the present invention will become apparent and obvious from a study of the following description and the accompanying drawings which are merely illustrative of such invention.

DESCRIPTION OF EXEMPLARY EMBODIMENT

Typically, wastewater influent includes ammonia nitrogen, $NH_3$—N. To remove ammonia nitrogen, a two-step process is called for, nitrification and Denitrification. First, the nitrification step entails converting the ammonia nitrogen ($NH_3$—N) to nitrate and a very small amount of nitrite, both commonly referred to as $NO_x$. There are a number of conventional processes that can be utilized in a nitrification process. For example, many conventional activated sludge wastewater treatment processes accomplish nitrification in an aerobic treatment zone. In an aerobic treatment zone the wastewater containing the ammonia nitrogen is subjected to aeration and this gives rise to a microorganism culture that effectively converts the ammonia nitrogen to $NO_x$. Once the ammonia nitrogen has been converted to $NO_x$, then the $NO_x$ containing wastewater is typically transferred to an anoxic zone for the purpose of denitrification. In the denitrification treatment zone, the $NO_x$ containing wastewater is held in a basin where there is no supplied air and this is conventionally referred to as an anoxic treatment zone. Here, a different culture of microorganisms operate to use the $NO_x$ as an oxidation agent and thereby reduces it to free nitrogen to escape to the atmosphere. This basically describes the conventional nitrification and Denitrification process. For a more complete and unified understanding of biological nitrification and Denitrification, one is referred to the disclosures found in U.S. Pat. Nos. 3,964,998; 4,056,465; 5,650,069; 5,137,636; and 4,874,519. The disclosures of these three patents are expressly incorporated herein by reference.

At this point, it is helpful to define "aerobic," "anaerobic," and "anoxic," as these terms are used in the present disclosure. First, it should be understood that "aerobic" means "oxygenated" or "aerated." "Anaerobic" is defined as the state existing within a wastewater treatment zone is substantially free of both dissolved oxygen and dissolved nitrate/nitrites ($NO_x$). Under anaerobic conditions, the dissolved oxygen concentration is less than approximately 0.7 ppm (parts-per-million) and preferably less than 0.4 ppm, while the dissolved $NO_x$ concentration is less than approximately 0.3 ppm and preferably less than 0.2 ppm expressed as elemental nitrogen. In an anaerobic zone, microorganisms primarily utilize energy derived from hydrolysis of polyphosphates for biological oxygen demand (BOD) absorption. Finally, "anoxic" is defined as the states existing within a wastewater treatment zone wherein the dissolved $NO_x$ concentration is greater than approximately 0.5 ppm expressed as elemental nitrogen. However, like an anaerobic zone, the dissolved oxygen concentration in an anoxic zone is less than approximately 0.7 ppm (parts-per-million) and preferably less than 0.4 ppm. Under anoxic conditions, microorganisms primarily use $NO_x$ for metabolism.

Figure 1:
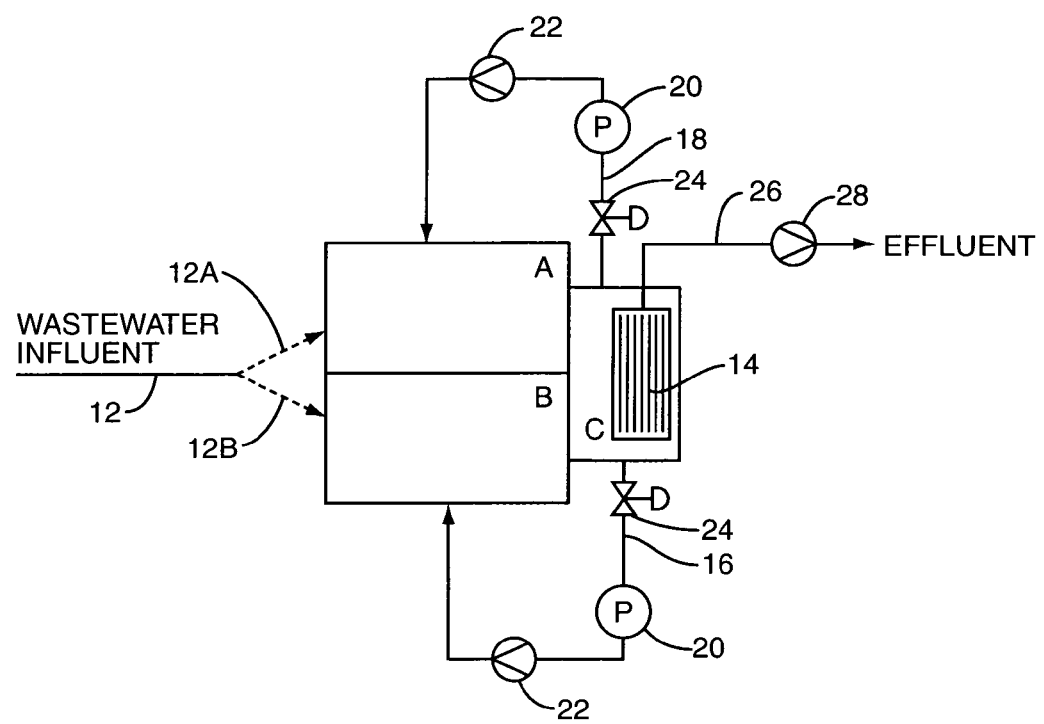
FIG. 1 is a schematic diagram illustrating the basic nitrification-denitrification process of the present invention.

FIG. 1 illustrates the nitrification-denitrification system of the present invention. Before describing the nitrification-denitrification process of the present invention it will be beneficial to briefly review the system and apparatus for carrying out this process. In that regard, as viewed in FIG. 1, an influent line 12 leads to two reactors, a first reactor that is denoted reactor A and a second reactor denoted reactor B. As will be appreciated from subsequent portions of this disclosure, wastewater influent will be alternatively directed to each of the reactors A and B. That is, for one period of time wastewater influent will be directed only into reactor A, while at other periods of time wastewater influent will only be directed into reactor B. Accordingly, the system is provided with a pair of feed lines 12A and 12B that extend between the influent line 12 and the reactors A and B. By utilizing a valve, or other conventional flow control means, it is appreciated that wastewater influent passing through influent line 12 can be alternatively directed through feed lines 12A or 12B to each of the reactors A or B.

Located downstream of reactors A and B is an aerobic membrane reactor C that is sometimes referred to as a third reactor or a membrane tank. The aerobic membrane reactor C is disposed such that wastewater or mixed liquor in either reactor A or B can be directed into reactor C. The term "mixed liquor" is used in the conventional sense to refer to the mixture of wastewater and activated sludge. One or more immersed membrane filters 14 are disposed in reactor C. Details of the membrane reactor filter 14 will not be dealt with herein because such is not per se material to the present invention, and further, membrane filters are commercially known and used. Suffice to say that mixed liquor directed to the aerobic reactor C is directed through the immersed membrane filter 14 which effectively separates the wastewater into a permeate and activated sludge. In the case of the system shown in FIG. 1, permeate is pumped from the membrane filter 14 and from reactor C through effluent line 26 that includes a check valve 28 disposed therein.

Further, aerobic reactor C would include a system for dispersing air underneath and around the membrane filter 14. The area immediately under and adjacent the membrane filter 14 should be scoured continuously with compressed air in order to minimize fouling. Likewise, because reactors A and B must, at various times in the process of the present invention, be operated under nitrification conditions, they too would be provided with aerators or other conventional means of aerating the wastewater or mixed liquor contained therein. Details of such aeration devices are not dealt with herein in detail because such is not per se material to the present invention, and further, aeration devices and means are commonly used in wastewater facilities and are well known and appreciated by those skilled in the art. Additionally, reactors A and B may be provided with mixers that would mix the wastewater and return activated sludge.

As noted above, the immersed membrane filter 14 effectively separates the mixed liquor in reactor C into permeate and activated sludge. Activated sludge is returned to either reactor A or reactor B. Accordingly, as shown in FIG. 1, there is provided a return activated sludge line 16 that leads from aerobic reactor C to reactor B. Return activated sludge line 16 includes a main on/off control valve 24, a pump 20 and a one-way check valve 22. Likewise, there is provided another return activated sludge line 18 that leads from aerobic reactor C to reactor A. Return activated sludge line 18 includes a main on/off control valve 24, a pump 20 and a one-way check valve 22. As will be appreciated from subsequent portions of this disclosure, in a typical nitrification-denitrification process, operated according to the present invention, the activated sludge in the reactor C will only be returned to one of the reactors A or B, depending on their mode of operation at any given time. More particularly, as illustrated below, during certain phases in the present nitrification-denitrification process one of the reactors A or B will be operating in a denitrification mode which entails the reactor being operated under anoxic conditions. It is desirable to reduce or minimize the dissolved oxygen that is returned to the anoxic reactor. Therefore in this case, the return activated sludge would ordinarily not be returned to the anoxic zone, but would be returned to the other reactor which, in most cases, would be operating under aerobic conditions so as to carry out a nitrification process.

Figure 2:
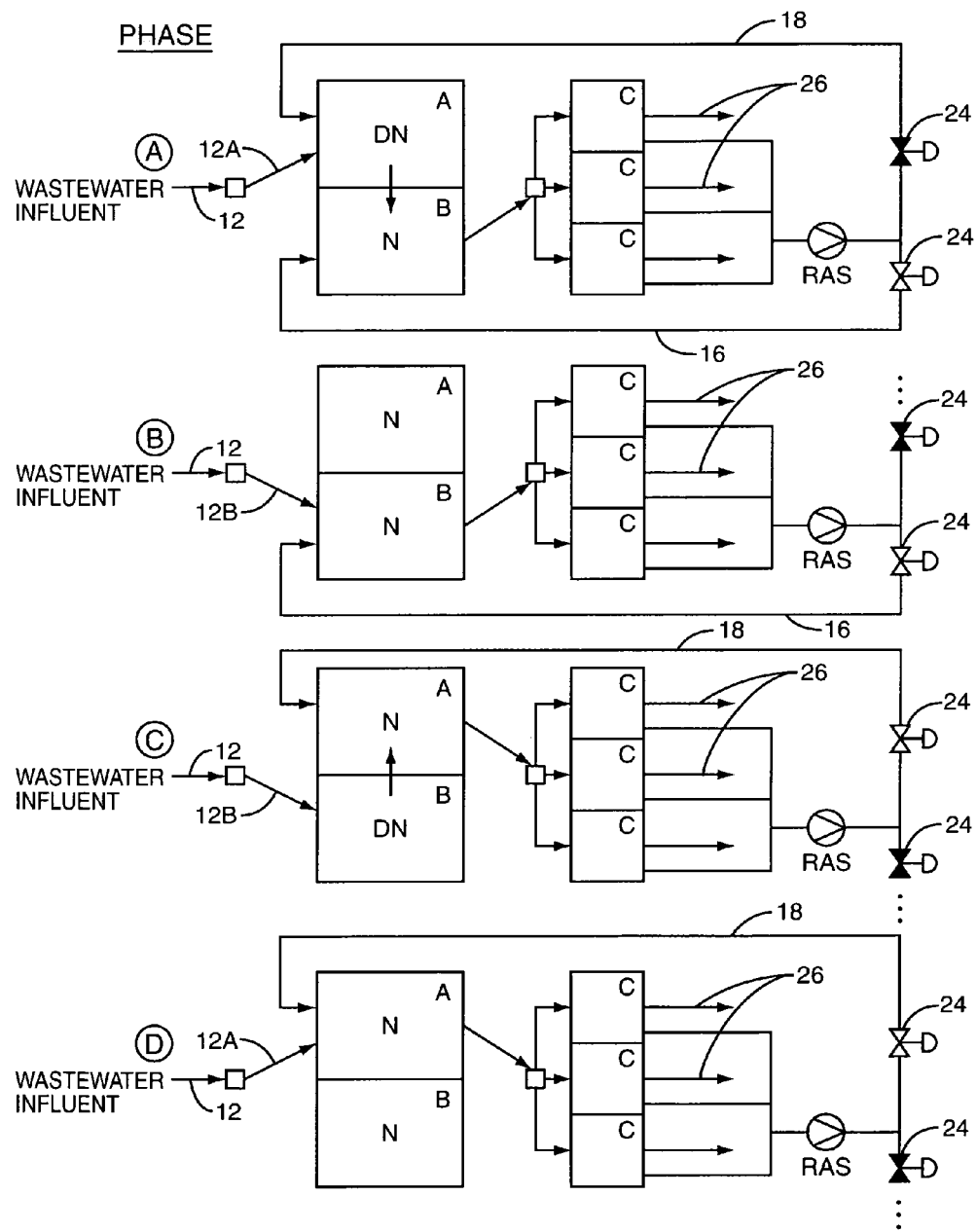
FIG. 2 is a diagram illustrating a multi-phase nitrification-denitrification process according to the present invention.

Turning to FIG. 2, there is shown therein a four phase nitrification-denitrification process according to the present invention. In phase A, wastewater influent is directed through influent line 12 and through feed line 12A into reactor A. Reactor A, during phase A, is operated under anoxic conditions to give rise to a denitrification (DN) process. The other reactor B is operated under aerobic conditions and performs a nitrification (N) process. Wastewater or mixed liquor in reactor A is directed to reactor B. The mixed liquor or wastewater in reactor B, which has been subjected to nitrification, is directed to a bank of aerobic reactors C. Each aerobic reactor C would include one or more immersed membranes 14 as discussed above and as shown in FIG. 1. Each aerobic reactor C includes an effluent line 26 through which permeate flows. Further, the bank of aerobic reactors C includes lines extending therefrom for channeling return activated sludge. The return activated sludge from the aerobic reactors C is consolidated and directed into either return activated sludge line 16 or return activated sludge line 18. In the case of phase A, as illustrated in FIG. 2, the control valve 24 in line 18 is closed such that return activated sludge is not directed back to the denitrification (DN) zone. Instead, the control valve 24 in return activated sludge line 16 is open and return activated sludge is pumped from the respective aerobic reactor C through line 16 back to reactor B that is operating as a nitrification (N) zone.

At a selected point in the process, phase B, as illustrated in FIG. 2 is instituted. In phase B, the wastewater influent being directed through line 12 is directed through feed line 12B into reactor B which is still maintained as a nitrification (N) zone. However, reactor A is now being operated under aerobic conditions which mean that reactor A is being maintained as a nitrification (N) zone. There is no transfer of wastewater or mixed liquor between reactors A and B. Return activated sludge consolidated from the reactor C continues to be returned through return activated sludge line 16 to reactor B.

Thereafter, the nitrification-denitrification process shifts to a third phase, phase C. Here the wastewater influent continues to be directed first into reactor B. However, the mode of reactor B has changed from phase B to where reactor B now operates under anoxic conditions, giving rise to a denitrification (DN) zone. Mixed liquor or wastewater influent from reactor B is directed to reactor A that remains in an aerobic mode for nitrification (N). However, in phase C mixed liquor or wastewater is directed from reactor A to the bank of aerobic reactors C. Because reactor B is being operated as a denitrification (DN) zone, the return activated sludge is returned through line 18 to reactor A, which is being operated as a nitrification zone.

A fourth phase for the nitrification-denitrification process is shown in FIG. 2 and denoted phase D. In this case wastewater influent is switched to where it enters reactor A which remains a nitrification (N) zone. However, reactor B changes states and is now operated also as a nitrification (N) zone. There is no transfer of wastewater or mixed liquor between reactors A and B. Like phase C, wastewater or mixed liquor from reactor A is directed to the bank of aerobic reactors C and the return activated sludge is directed through line 18 back to reactor A, which again is maintained under aerobic conditions.

Phases A through D explain or disclose one possible nitrification-denitrification process according to the present invention. It is to be appreciated that this is but one example of a multi-phase nitrification-denitrification process. There are other flow schemes and phase arrangements that can be carried out in accordance with the present invention. In the case of the example shown in FIG. 2 and described above, it is contemplated that the duration for phases A and C in this exemplary process would be approximately 1.5 hours, while the time duration for phases B and D in this exemplary process would be approximately 0.5 hours. Generally, the detention time or time duration for a nitrification-denitrification process according to the present invention would be approximately 2 to 6 hours.

Typically the regular rate from the aerobic reactor or reactors C to either reactor A or B would be approximately 4 to 5 times the influent flow rate.

Figure 3:
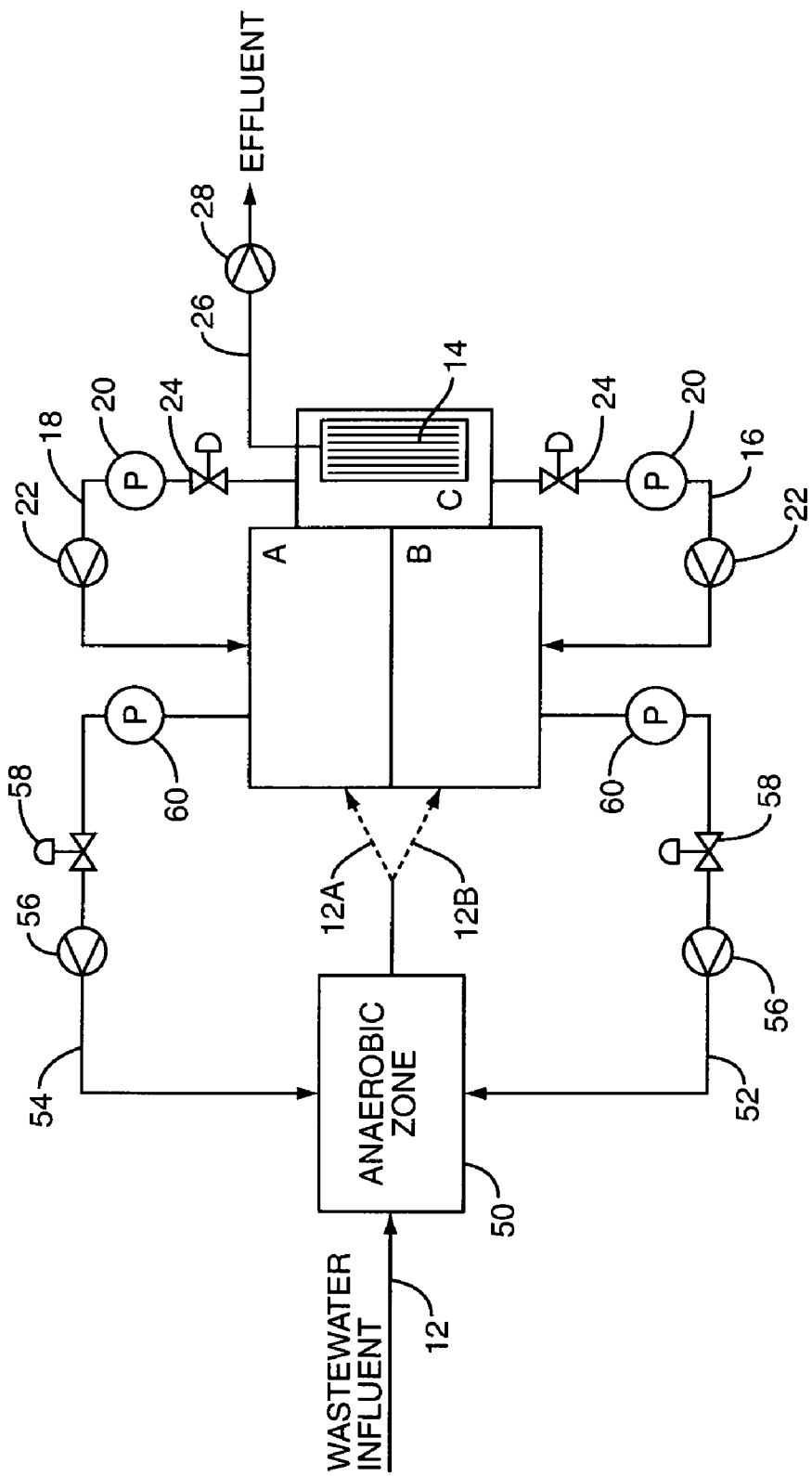
FIG. 3 is a diagram illustrating an alternative embodiment of the present invention and particularly illustrating a process for nitrification and denitrification wastewater and for the removal of phosphorus from the wastewater.

The system and process described above is useful for nitrifying and denitrifying wastewater. However, the system and process can be modified to deal with other contaminants or undesirable elements or compositions within the wastewater. For example, the system shown in FIG. 3 is effective to not only nitrify and denitrify wastewater, but is also effective in removing phosphorus. In this regard, and with respect to FIG. 3, the system includes an anaerobic reactor or zone 50. The anaerobic reactor 50 is disposed upstream from reactors A and B described above. In addition there are two recycle lines that lead from reactors A and B to the anaerobic zone 50. First there is recycle line 52 that leads from reactor B to anaerobic zone 50. Additionally, there is recycle line 54 that leads from reactor A to anaerobic zone 50. Both recycle lines 52 and 54 include an on/off control valve 58, a check valve 56, and a pump 60.

The system illustrated in FIG. 3 is effective for both nitrification and denitrification as well as phosphorus removal. As seen in the schematic of FIG. 3, the anaerobic zone 50 is disposed upstream of reactors A and B. This means, of course, that the wastewater influent is first directed into the anaerobic zone 50 where the wastewater or mixed liquor is maintained under anaerobic conditions. Under anaerobic conditions, the dissolved oxygen concentration is generally less than approximately 0.7 ppm and preferably less than approximately 0.4 ppm, while the dissolved $NO_x$ concentration is less than approximately 0.3 ppm, and preferably less than 0.2 ppm expressed as elemental nitrogen.

At various times the mixed liquor in reactors A and B is recycled back to the anaerobic zone or reactor 50. In particular, recycle of the mixed liquor in reactors A or B generally only occurs when the respective reactors are maintained under anoxic conditions. Hence, in the process illustrated in FIG. 3, preferably the mixed liquor in A would only be recycled back through recycle line 54 to anaerobic zone 50 when reactor A is operating in a denitrifying (DN) mode. The same would be true for reactor B. Typically the regular rate from reactor A or B to the anaerobic zone 50 would be approximately 0.5 to 1.0 of the influent flow rate.

In any event, in the process illustrated in FIG. 3, mixed liquor from the anaerobic zone is directed to either reactor A or B, and the process downstream of the anaerobic zone 50 is substantially as described above inasmuch as reactors A and B function to nitrify and denitrify the wastewater. Therefore, in the process illustrated in FIG. 3, by utilizing the anaerobic zone 50 upstream from the reactors A and B, the process achieves both nitrification-denitrification and removal of phosphorus. The details of the phosphorus removing process is not dealt with herein in detail because the principles underlying phosphorus removal by utilizing an anaerobic zone are well known and appreciated by those skilled in the art. However, for a more complete and unified understanding of the phosphorus removal process one is referred to U.S. Pat. No. 4,056,465, the contents of which are expressly incorporated herein by reference.

As discussed above, the process of the present invention minimizes or reduces the dissolved oxygen concentration in the return activated sludge directed into a denitrification (DN) zone being carried out in reactors A or B. The one or more membranes 14 disposed in the aerobic reactor or reactors C are subject to fouling due to a biomass concentration gradient produced by the flux and the subsequent accumulation and dewatering mechanism acting on the solids. To remedy fouling, the area immediately under and adjacent the membrane filters 14 should be scoured continuously with compressed air. The high air scour flow rate required to effectively scour the membrane filters 14 often results in local high dissolved oxygen concentration, which is then carried back to an upstream zone along with the recycled biomass. This dissolved oxygen carryover will reduce denitrification rates in a denitrification (DN) zone due to the presence of the alternative electron acceptor ($O_2$) and a reduction of readily available carbon source (soluble BOD). This results in the effluent soluble nitrogen concentration being elevated. This effect becomes even more evident as the system approaches design flow capacity and the actual hydraulic detention time of the anoxic or denitrifying reactor decreases. Since the recirculation rates are high (2 to 4 times influent flow rate), the high dissolved oxygen concentration in the recycled stream presents a concern in a nitrification-denitrification process. Accordingly, to deal with this concern, the present invention controls the flow of the oxygen rich activated sludge to the reactors A and B. Essentially the dissolved oxygen return to reactors A and B is selectively controlled such that the return activated sludge is generally returned to the reactor A or B operating under aerobic or nitrifying conditions. This, of course, means that generally the oxygen rich return activated sludge is not returned to the denitrifying zone.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

The invention claimed is:

1. A process of nitrifying and denitrifying wastewater and reducing or minimizing the DO concentration in a denitrification zone of a nitrification/denitrification system that includes an aerobic reactor having one or more immersed membranes contained therein comprising:

a. alternatively directing a wastewater influent into first and second zones;

b. at various times during the process maintaining the first zone as a nitrification zone and maintaining the second zone as a denitrification zone, and at various other times, maintaining the first zone at a denitrification zone and the second zone as a nitrification zone;

c. directing wastewater from either of the first or second zones to the downstream aerobic reactor having the one or more immersed membranes therein;

d. aerating the aerobic reactor;

e. directing wastewater in the aerobic reactor into the one or more immersed membranes and separating the wastewater into a permeate and return activated sludge;

f. pumping the permeate from the one or more immersed membranes in the aerobic reactor;

g. returning activated sludge from the aerobic reactor to either of the first or second zones; and h. during the process reducing or minimizing the DO concentration in the denitrification zones by selectively directing the return activated sludge to one of the first or second zones being maintained as a nitrification zone and switching the flow of the return activated sludge during the process between the first and second zones so as to direct the return activated sludge to the first or second zone being maintained as the nitrification zone.

2. The process of claim 1 wherein the wastewater flow from the first and second zones to the downstream aerobic reactor is switched such that the flow of wastewater to the downstream aerobic reactor is from the zone being maintained as a nitrification zone.

3. The process of claim 2 wherein wastewater is directed from the first or second zone being maintained as a denitrification zone to the other zone.

4. The process of claim 2 wherein at various times both the first and second zones are maintained as nitrification zones.

5. The process of claim 1 wherein at various times one of the first or second zones is maintained as a denitrification zone and the other zone is maintained as a nitrification zone.

6. The process of claim 1 including removing phosphorus from the wastewater by directing the wastewater into an anaerobic zone upstream from the first and second zones that are alternatively maintained as nitrification and denitrification zones.

7. The process of claim 6 further including at various times recycling wastewater from the first or second zone when denitrifying the wastewater therein to the anaerobic zone.

8. The process of claim 6 including alternatively recycling wastewater from either the first or second zone to the anaerobic zone as the first and second zones are switched between nitrifying and denitrifying zones.

9. A process of nitrifying and denitrifying wastewater utilizing first and second reactors and a downstream third aerobic reactor having one or more immersed membrane filters contained therein, the process comprising:

a. alternatively directing influent wastewater into the first and second reactors;

b. alternatively nitrifying and denitrifying the wastewater in the first and second reactors such that at one time the first reactor performs a nitrification function while the second reactor performs a denitrification function, and at another time the first reactor performs a denitrifying function while the second reactor performs a nitrifying function;

c. alternatively directing influent from the first and second reactors to the downstream third aerobic reactor having the one or more immersed membrane filters contained therein;
d. filtering the wastewater in the downstream third aerobic reactor by directing the wastewater into the immersed membrane filter and separating the wastewater into filtered effluent and activated sludge;
e. pumping the filtered effluent from the immersed membrane filter; and
f. returning activated sludge from the downstream third aerobic reactor having the immersed membrane filtered therein to one of the first or second reactors functioning to nitrify the wastewater.

10. The process of claim 9 wherein during the process of treating the wastewater each of the first and second reactors switch between nitrifying and denitrifying the wastewater; and wherein there is provided a return activated sludge line between the downstream third aerobic reactor and each of the first and second reactors, and wherein the flow of return activated sludge is switched between the two return activated sludge lines such that return activated sludge is recycled to the first or second reactor nitrifying the wastewater.

11. The process of claim 10 including removing phosphorus in the wastewater by directing the wastewater into an anaerobic zone upstream from the first and second reactors that are alternatively maintained as nitrification and denitrification zones.

12. The process of claim 9 wherein during the process wastewater is directed from one of the first or second reactors denitrifying the wastewater to the other one of the first or second reactors nitrifying the wastewater.

13. The process of claim 9 wherein wastewater in the reactor nitrifying the wastewater is directed to the downstream aerobic reactor.

14. The process of claim 9 wherein the process includes at least four phases, and wherein
a. in a first phase wastewater influent is directed into the first reactor maintained under anoxic conditions and which functions to denitrify the wastewater and wherein the wastewater in the first reactor is directed to the second reactor which is maintained under aerobic conditions and nitrifies the wastewater therein, and wherein the wastewater from the second reactor is directed to the downstream third aerobic reactor where the immersed membrane filter separates the wastewater into permeate and activated sludge and a portion of the activated sludge is returned to the second reactor operating under aerobic conditions;
b. in a second phase where wastewater influent is directed into the second reactor which is maintained under aerobic conditions and nitrifies the wastewater therein while the first reactor is maintained under aerobic conditions and wherein the wastewater from the second reactor is directed to the downstream third aerobic reactor where the wastewater is separated by the immersed membrane filter into permeate and return activated sludge, and wherein the return activated sludge is directed from the downstream third aerobic reactor to the second reactor;
c. in a third phase the wastewater influent is directed into the second reactor which is maintained under anoxic conditions and denitrifies the wastewater therein, wherein the wastewater in the second reactor is directed to the first reactor which is maintained under aerobic conditions and nitrifies the wastewater therein and wherein the wastewater from the first reactor is directed to the downstream third aerobic reactor where the wastewater is separated by the immersed membrane filter into permeate and return activated sludge, and wherein the return activated sludge is directed from the downstream third aerobic reactor to the first reactor; and
d. in a fourth phase wastewater influent is directed into the first reactor which is maintained under aerobic conditions and nitrifies the wastewater therein while the second reactor is maintained under aerobic conditions and nitrifies the wastewater therein, and wherein the wastewater in the first reactor is directed to the downstream aerobic reactor where the immersed membrane filter separates the wastewater into permeate and return activated sludge, and wherein the return activated sludge is directed from the downstream aerobic reactor to the first reactor.

15. The process of claim 14 wherein the detention time of the wastewater is approximately 2 to 6 hours.

16. The process of claim 14 wherein in the first phase wastewater is directed from the first reactor to the second reactor and in the third phase wastewater is directed from the second reactor to the first reactor.

17. The process of claim 16 including recycling wastewater from the first or second reactor while anoxic conditions are being maintained therein to the anaerobic reactor.

* * * * *